(12) United States Patent
Bajaj et al.

(10) Patent No.: US 7,530,880 B2
(45) Date of Patent: May 12, 2009

(54) METHOD AND APPARATUS FOR IMPROVED CHEMICAL MECHANICAL PLANARIZATION PAD WITH PRESSURE CONTROL AND PROCESS MONITOR

(75) Inventors: Rajeev Bajaj, Fremont, CA (US); Natraj Narayanswami, San Jose, CA (US); Bang C. Nguyen, Palo Alto, CA (US)

(73) Assignee: Semiquest Inc., San Jose, CA (US)

( * ) Notice: Subject to any disclaimer, the term of this patent is extended or adjusted under 35 U.S.C. 154(b) by 0 days.

(21) Appl. No.: 11/576,944

(22) PCT Filed: Oct. 5, 2005

(86) PCT No.: PCT/US2005/035978

§ 371 (c)(1),
(2), (4) Date: Apr. 21, 2008

(87) PCT Pub. No.: WO2006/057720

PCT Pub. Date: Jun. 1, 2006

(65) Prior Publication Data

US 2008/0268760 A1 Oct. 30, 2008

Related U.S. Application Data

(60) Provisional application No. 60/631,189, filed on Nov. 29, 2004, provisional application No. 60/636,055, filed on Dec. 14, 2004.

(51) Int. Cl.
*B24B 49/00* (2006.01)

(52) U.S. Cl. .................. 451/5; 451/10; 451/11; 451/288; 451/527

(58) Field of Classification Search ............ 451/5, 451/8, 10, 11, 12, 41, 285, 287, 288, 526, 451/527, 530
See application file for complete search history.

(56) References Cited

U.S. PATENT DOCUMENTS

| 5,212,910 A | 5/1993 | Breivogel et al. |
| 5,489,233 A | 2/1996 | Cook et al. |
| 5,607,346 A | 3/1997 | Wilson et al. |

(Continued)

FOREIGN PATENT DOCUMENTS

JP 2001071256 A 3/2001

OTHER PUBLICATIONS

"International Search Report" and "Written Opinion of the International Search Report", International Searching Authority, Oct. 5, 2005, PCT/US05/35978.

(Continued)

*Primary Examiner*—Eileen P. Morgan
(74) *Attorney, Agent, or Firm*—Sonnenschein, Nath & Rosenthal LLP

(57) ABSTRACT

A pad for CMP operations includes a guide plate having a plurality of holes therein and being affixed to a compressible under-layer; and a plurality of pressure-sensing and process monitoring polishing elements each affixed to the compressible under-layer and passing through a corresponding hole in the guide plate so as to be maintained in a substantially vertical orientation with respect to the compressible under-layer but being translatable in a vertical direction with respect to the guide plate.

21 Claims, 4 Drawing Sheets

U.S. PATENT DOCUMENTS

| | | | |
|---|---|---|---|
| 5,609,517 | A | 3/1997 | Lofaro |
| 5,795,218 | A | 8/1998 | Doan et al. |
| 5,893,976 | A | 4/1999 | Bauer |
| 6,019,666 | A | 2/2000 | Roberts et al. |
| 6,024,630 | A | 2/2000 | Shendon et al. |
| 6,089,965 | A | 7/2000 | Otawa et al. |
| 6,090,475 | A | 7/2000 | Robinson et al. |
| 6,498,101 | B1 | 12/2002 | Wang |
| 6,612,916 | B2 | 9/2003 | Kollodge et al. |
| 6,752,693 | B1 * | 6/2004 | Kistler ............... 451/8 |
| 6,794,605 | B2 | 9/2004 | Park et al. |
| 6,962,524 | B2 | 11/2005 | Butterfield et al. |
| 6,986,705 | B2 | 1/2006 | Preston et al. |
| 7,020,306 | B2 | 3/2006 | Hirose et al. |
| 7,153,182 | B1 * | 12/2006 | Taylor et al. ............ 451/5 |
| 7,192,340 | B2 | 3/2007 | Ono et al. |
| 2001/0035354 | A1 | 11/2001 | Ashjaee et al. |
| 2001/0039175 | A1 | 11/2001 | Golzarian et al. |
| 2002/0052052 | A1 * | 5/2002 | Robinson et al. ........ 438/5 |
| 2002/0173255 | A1 | 11/2002 | Shendon et al. |
| 2003/0132120 | A1 | 7/2003 | Emesh et al. |
| 2003/0153245 | A1 * | 8/2003 | Talieh et al. ............ 451/8 |
| 2003/0209528 | A1 | 11/2003 | Choo et al. |
| 2004/0110381 | A1 | 6/2004 | Yoshida |
| 2004/0166779 | A1 | 8/2004 | Balijepalli et al. |
| 2004/0232121 | A1 | 11/2004 | Park et al. |
| 2006/0063469 | A1 * | 3/2006 | Talieh et al. ............ 451/5 |
| 2006/0079159 | A1 | 4/2006 | Naujok et al. |
| 2007/0232203 | A1 * | 10/2007 | Fukuda et al. .......... 451/56 |

OTHER PUBLICATIONS

Bajaj, Rajeev, PCT/US05/35979 filed Oct. 5, 2005, International Search Report and Written Opinion, Feb. 24, 2006, 8pp, International Searching Authority-US, Alexandria, Virginia.

Bajaj, Rajeev, PCT/US05/35732 filed Oct. 5, 2005, International Search Report and Written Opinion, Nov. 28, 2006, 6pp, International Searching Authority-US, Alexandria, Virginia.

Bajaj, Rajeev, PCT/US05/35660 filed Oct. 5, 2005, International Search Report and Written Opinion, Jun. 15, 2007, 8pp, International Searching Authority-US, Alexandria, Virginia.

* cited by examiner

METHOD AND APPARATUS FOR IMPROVED CHEMICAL MECHANICAL PLANARIZATION PAD WITH PRESSURE CONTROL AND PROCESS MONITOR

RELATED APPLICATIONS

This application is a U.S. National Stage of PCT/US05/35978, filed 5 Oct. 2005, which claims the priority benefit of and incorporates by reference U.S. Provisional Patent Application No. 60/631,189, filed Nov. 29, 2004 and U.S. Provisional Patent Application No. 60/636,055, filed Dec. 14, 2004; all of which is incorporated herein by reference.

FIELD OF THE INVENTION

The present invention relates to the field of chemical mechanical planarization (CMP) and relates specifically to a polishing pad for use in CMP processing, said pad having uniform or near uniform polishing performance across its surface.

BACKGROUND OF THE INVENTION

In modern integrated circuit (IC) fabrication, layers of material are applied to embedded structures previously formed on semiconductor wafers. Chemical mechanical planarization (CMP) is an abrasive process used to remove these layers and polish the surface of a wafer flat to achieve the desired structure. CMP may be performed on both oxides and metals and generally involves the use of chemical slurries applied via a polishing pad that is moved relative to the wafer (e.g., the pad may rotate circularly relative to the wafer). The resulting smooth, flat surface is necessary to maintain the photolithographic depth of focus for subsequent steps and to ensure that the metal interconnects are not deformed over contour steps.

The planarization/polishing performance of a pad/slurry combination is impacted by, among other things, the mechanical properties and slurry distribution ability of the polishing pad. Typically, hard (i.e., stiff) pads provide good planarization, but are associated with poor with-in wafer non-uniformity (WIWNU) film removal. Soft (i.e., flexible) pads, on the other hand, provide polishing with good WIWNU, but poor planarization. In conventional CMP systems, therefore, harder pads are often placed on top of softer pads to improve WIWNU. Nevertheless, this approach tends to degrade planarization performance when compared to use of a hard pad alone.

It is therefore the case that designing CMP polishing pads requires a trade-off between WIWNU and planarization characteristics of the pads. This trade-off has led to the development of polishing pads acceptable for processing dielectric layers (such as silicon dioxide) and metals such as tungsten (which is used for via interconnects in subtractive processing schemes). In copper processing, however, WIWNU directly impacts over-polishing (i.e., the time between complete removal of copper on any one area versus complete removal from across an entire wafer surface) and, hence, metal loss and, similarly, planarization as expressed by metal loss. This leads to variability in the metal remaining in the interconnect structures and impacts performance of the integrated circuit. It is therefore necessary that both planarity and WIWNU characteristics of a pad be optimized for best copper process performance.

Some of the above-described concepts can be illustrated graphically. FIG. 1A illustrates the surface of a post-CMP wafer 100 with copper interconnects 104 defined in a low-K dielectric layer 102. Stress induced cracking damage 106 is seen on the surface of the dielectric layer 102, as a result of using a conventional polishing pad.

In addition to monitoring pressures, the ability to monitor process conditions while a wafer is being polished is important as it can provide information on the wafer surface, which, in turn, may be utilized to change the process conditions or stop processing all together. In the case of copper CMP for example, the actual copper thickness may be monitored to change the process conditions when a wafer has only a predetermined thickness of copper remaining or to change polishing slurry when all copper has been cleared. More than one type of feedback maybe required to understand the processing of the wafer. For example, in the case of copper processing, temperature rises during polishing of a copper film. The slope of this rise as well as the magnitude of the rise gives information on not only removal rate, but may also be able to provide insight into the behavior of the slurry.

FIG. 1B illustrates the surface of a copper wafer 108 after electroplated copper 110 has been deposited. Conformal filling of the copper 110 over large features 112 is evident, while overlay of smaller features 114 shows no such topography. FIG. 1C illustrates the surface of the wafer 108 post-CMP. Dishing and erosion of the features (108, and 110 respectively) is now evident. Dishing and erosion increase with over-polishing, hence there is a need to minimize over-polishing of copper wafers.

SUMMARY OF INVENTION

A pad configured according to an embodiment of the present invention includes a guide plate having a plurality of holes therein and being affixed to a compressible under-layer; and a plurality of pressure-sensing and process monitoring elements each affixed to the compressible under-layer and passing through a corresponding hole in the guide plate so as to be maintained in a substantially vertical orientation with respect to the compressible under-layer but being translatable in a vertical direction with respect to the guide plate. The pad may further include a slurry distribution material fastened to the guide plate by an adhesive.

BRIEF DESCRIPTION OF THE DRAWINGS

The present invention is illustrated by way of example, and not limitation, in the figures of the accompanying drawings, in which.

DETAILED DESCRIPTION

Figure 1A:
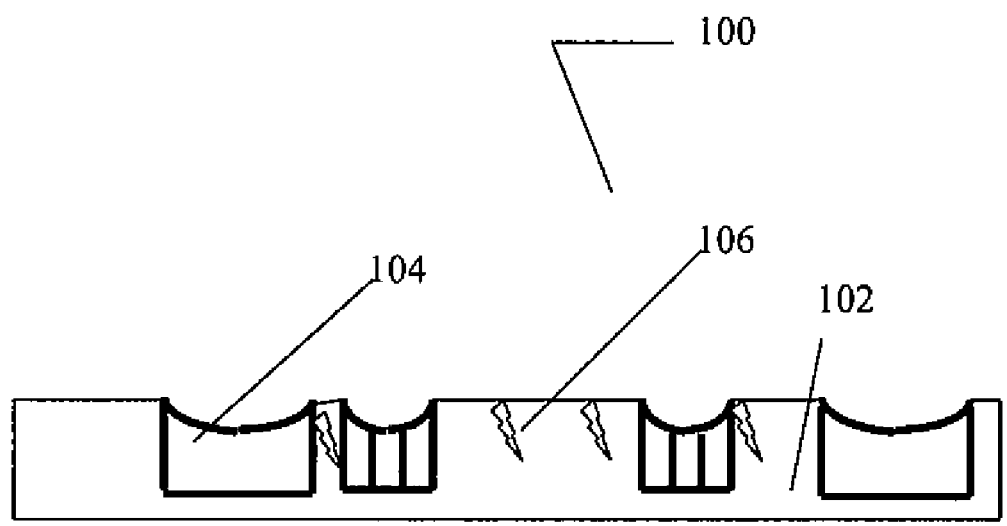
FIG. 1A illustrates the effects of stress induced cracking in a low-K dielectric layer disposed on a semiconductor wafer due to polishing with a conventional CMP pad.
Figure 1B:
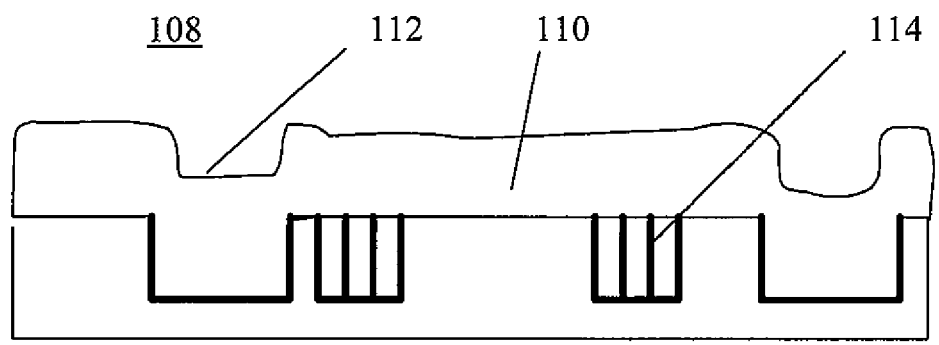
FIGS. 1B and 1C illustrate effects of layering copper over a wafer surface and subsequent erosion and dishing as occur following removal thereof by conventional CMP.
Figure 1C:
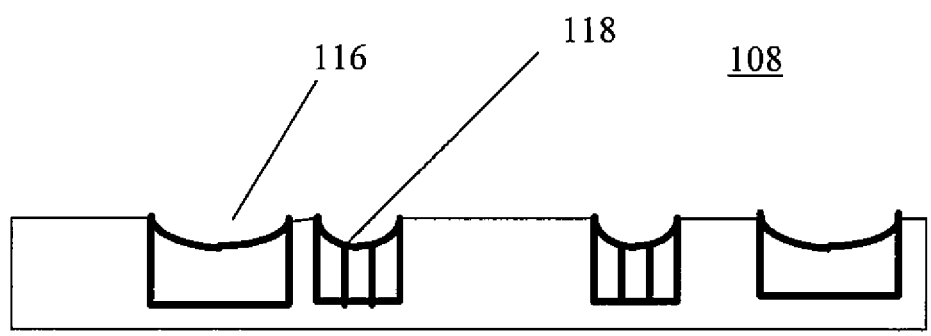

Described herein is a process monitoring/pressure-sensing pad suitable for use in a variety of CMP processes. A pad containing polishing elements which are coupled with pressure monitoring sensor is applied to the polishing table, a wafer is pressed against the polishing pad with a desired force and slurry is applied to the pad surface while it is rotated against the wafer. The pressure sensing pad detects the pressure with which the wafer is being pressed against the pad through pressure sensing elements. This data can be used to determine the pressure distribution across the wafer in real time (or near real time). The information may be used to effect uniform polish pressure across the wafer and/or to generate a pressure profile. The pressure information is also useful in processing the wafer below a critical threshold pressure such that no location on the wafer experiences more than a threshold pressure.

In one embodiment of the present invention, the pressure sensing structure includes three components: pressure sensing contacts, a guide plate and an elastic, resilient under-layer. The pressure detected by the pressure sensing contacts is transmitted to an external circuit for processing. To enable true in-situ process monitoring, the signals from sensor may be wirelessly transmitted for external processing and display of data. A pressure sensing polishing pad may include, in addition to the pressure sensing elements, a polishing fluid or slurry distribution layer, a plurality of polishing elements, a contact guide plate and a compressible under-layer.

In varying embodiments of the present invention, the pressure-sensing elements may be made of any suitable material such as polymer, metal or ceramic and are capable of transmitting pressure measurements to one or more external circuits (e.g., in the form of electrical signals). The pressure-sensing polishing elements are preferably made of suitable polymer, which may or may not be mixed with abrasive particles.

In one embodiment of the present invention, the pressure sensing elements are also connected to a pressure control mechanism to effect an appropriate pressure profile during polishing. That is, a predetermined pressure profile may be applied by monitoring the pressures detected by the pressure sensing elements and comparing that information to an established pressure model. Differences between the actual pressures and the pressure model may then be used to alter the polishing operations to effect the desired pressure profile.

The present invention recognizes the importance of pressure sensing and control in advanced polishing processes. Fragile low-K materials can be easily damaged by high stresses resulting from polishing operations. Nucleation of failure sites can occur at local high-pressure spots. A pressure-sensing pad configured according to the present invention provides the necessary information to develop polishing processes which do not exceed critical stress levels during processing operations.

In one embodiment, a pressure-sensor is coupled with or embedded in the polishing element which makes a direct contact with the wafer. Moreover, the pressure-sensing pad described herein may be used in a variety of steps associated with CMP processing.

In some embodiments of the present invention, the polishing pad may be configured with a capability to provide polish process monitoring. That is some or all of the polishing elements may be configured as process monitoring polishing elements. For example, if some or all of the polishing elements are made of an optically transparent material (e.g., a transparent polymer such as polyurethane, polyester, polycarbonate, delrin, etc.), a suitable signal (e.g., light) may be utilized to determine the state of the wafer surface during polishing. Alternately a suitable sensor maybe embedded in the polishing element to detect an appropriate electrical signal. The remaining overall construction and use of the pad remains as discussed above. In varying embodiments of the present invention, polishing elements are made of any suitable material such as polymer, metal, ceramic or combination thereof and capable of movement in the vertical axis. Alternatively, or in addition, the polishing elements may be made in composite structures where a core is made of one material and the shell is made of another material (e.g., one of which is transparent or conductive). For example, a polishing element may contain a core made of a conductive material such as graphite or conductive polymer. Alternately, a polishing element may contain a core or conductive element and another conductive element ring surrounding it separated by an insulating polymer, which is again surrounded by polymer. Polishing element with such dual conductive core and shell arrangements may be utilized to determine the thickness of copper on the wafer surface. Similar structures may be employed to make an optically transparent core with opaque shell or vice-versa.

As indicated above, in such a pad some of the polishing elements may include a pressure sensor embedded into the polishing element. Pressure is transmitted from each such element to generate a pressure profile across the wafer. Alternatively or in addition an eddy current sensor may be embedded in the polishing element and used to determine the thickness of copper on the wafer surface.

In still further embodiments of the present invention, a pad may contain multiple types of elements containing different sensors and more than one process signal may be used to monitor wafer processing. As an example, current elements may be used to determine layer thickness distribution across the wafer while pressure elements are used to modify the local pressure to change the material removal profile across the wafer. Combinations of thickness profiles and pressure profiles may be used to control the removal process while optical elements may be used to determine when to modify or stop the processing of the subject wafer.

Figure 2:
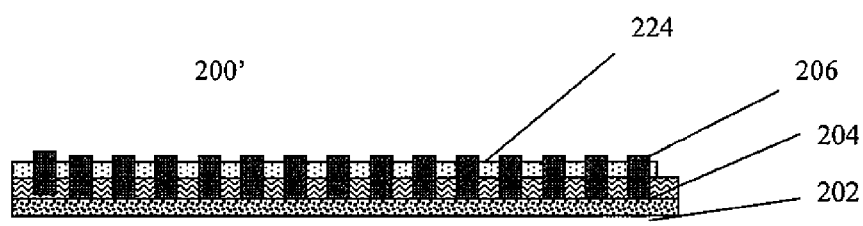
FIG. 2 illustrates cut-away, side profile views of a polishing pad configured in accordance with an embodiment of the present invention.

Turning now to FIG. 2, a cut-away side profile view of a circular pressure-sensing pad 200 configured according to one embodiment of the present invention is shown. Pressure elements 206 are placed through holes in a guide plate 204 and supported by a compressible foam under-layer 202. In use, a polishing pad is paled over pressure sensing pad 200 and the combination of these pads rotates relative to the wafer surface being polished, the surface of the polishing pad making contact with the wafer (typically under pressure). A slurry may be used between the polishing pad and the wafer.

The foundation of the process monitoring sensing pad is the guide plate 204, which provides lateral support for the pressure-sensing elements 206 and may be made of a non-conducting material such as a polymeric or polycarbonate material. The process-sensing elements 206 pass through holes in guide plate 206 and may be fixed to the under-layer 202 by an adhesive, such as double sided tape or epoxy. Thus, the polishing elements 206 are free to move in a vertical direction with respect to their long axis, through the holes in guide plate 204.

The pressure-sensing polishing elements may be constructed such that they have a base diameter larger than the diameter of the guide plate holes thru which they pass. For example, the body of the pressure-sensing elements may have a diameter "a" and the guide plate holes a diameter "b", such that "b" is slightly larger than "a", but nevertheless smaller than diameter "c", which is the diameter of the base of the pressure-sensing element. In essence then pressure-sensing elements will resemble a cylinder on top of a flat plate. In varying embodiments, the depth and spacing of the holes throughout the guide plate may be varied according to an optimized scheme tailored to specific CMP processes. The pressure-sensing elements are each maintained in planar orientation with respect to one other and the guide plate.

The process-sensing polishing elements 206 preferably protrude above surface of the guide plate 204, as illustrated. The volume created by the polishing elements above the guide plate will provide room for a slurry distribution material and in such embodiments, see, e.g., FIG. 2, the polishing elements may also protrude above the slurry distribution material by, say, 2.5 millimeters or less. It will be appreciated, however, that this value may be greater than 2.5 millimeters depending on the material characteristics of the polishing elements and the desired flow of slurry over the surface. The polishing elements may be of varying geometric shapes (e.g., circular and/or triangular cross sections) and, as indicated above, made from a variety of materials.

The compressible under layer 202 provides, among others features, a positive pressure directed toward the polishing surface when compressed. Typically, the compression may vary around 10% at 5 psi (pounds per square inch), however, it will be appreciated that the compression may be varied dependent upon the materials used in constructing the engineered polishing pad 300 and the type of CMP process. For example, the compressible under-layer 202 may be BONDTEX™ made by RBX Industries, Inc.

In one embodiment of the present invention, the pressure-sensors are included in some or all of the polishing elements. A slurry distribution plate 214 is introduced above and affixed to the guide plate. This slurry distribution plate may be fastened to the guide plate through the use of an adhesive (e.g., double sided tape) or other suitable means. The slurry distribution plate 214 provides a means for uniform distribution of slurry across the wafer surface thereby providing uniform polishing.

The volume between the interdigitated polishing elements 206 may be at least partially filled with the slurry distribution material 212. The slurry distribution material may include flow resistant elements such as baffles or grooves (not shown), or pores, to regulate slurry flow rate during CMP processing. In varying embodiments, the porous slurry distribution material has between 10 and 90 percent porosity and may be overlaid on guide plate 204. The slurry distribution material may be fastened to the guide plate by an adhesive, such as double sided tape. Additionally, the slurry distribution material may be comprised of various layers of differing materials to achieve desired slurry flow rates at varying depths (from the polishing surface) of the slurry distribution material. For example, a surface layer at the polishing surface may have larger pores to increase the amount and rate of slurry flow on the surface while a lower layer has smaller pores to keep more slurry near the surface layer to help regulate slurry flow. As indicated above, in addition to incorporating pressure sensors, process monitoring sensors may be included in the polishing elements. Such process monitoring sensors may be used to monitor a variety of steps associated with CMP processing through selection of appropriate polishing elements. Such process monitoring polishing elements may be made, partially or wholly, of optically transparent polymer for optical signal monitoring and may contain pressure sensing circuitry for pressure monitoring.

Construction of the process monitoring pad is generally similar to that discussed above for the pressure sensing pad illustrated in FIG. 2. The only difference is that the polishing elements now would include the process monitoring characteristics in place of (or in addition to) the pressure sensing features. The compressible under layer may be made of PORON™ performance polyurethane of Rogers Corp. and the process monitoring polishing elements may be made from thermoplastic polyurethane Pellethane 2102-65D made by DOW chemicals.

Figures 3A, 3B, 3C, 3D, 3E:
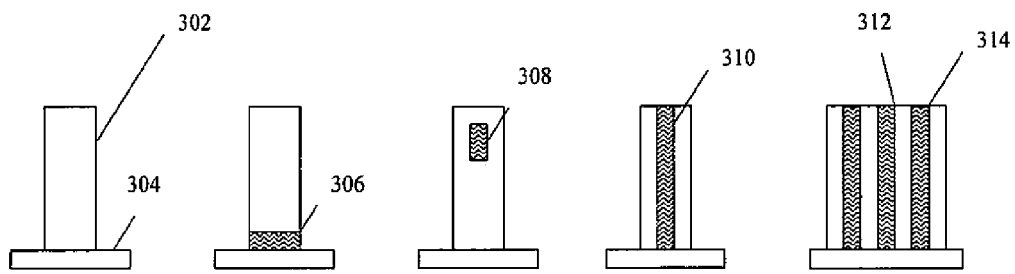
FIGS. 3A-3F illustrate examples of process monitoring polishing elements for use in accordance with various embodiments of the present invention.
Figure 3F:
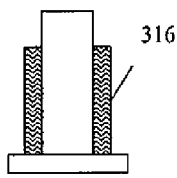

FIGS. 3A-3F illustrate different configurations of process monitoring polishing elements which may be used in accordance with embodiments of the present invention. Polishing elements configured as process monitoring polishing elements may be made of an optically transparent material (e.g., a transparent polymer such as polyurethane, polyester, polycarbonate, delrin, etc.), so a suitable signal (e.g., light) may be utilized to determine the state of the wafer surface during polishing. Alternately a suitable sensor maybe embedded in the polishing element to detect temperature or an appropriate electrical signal. FIG. 3A shows a typical polishing element consisting of a polishing end 302 and a base 304 and is made from a single material. FIG. 3B shows a polishing element with pressure sensing circuit 306 embedded therein. FIG. 3C shows a polishing element with a capacitive or eddy current sensor 308 embedded therein. FIG. 3D shows a polishing element with a conductive or optically transparent core 310. FIG. 3E shows a polishing element with conductive core and shell with both conducting components 312 separated by insulating material 314. FIG. 3F shows a polishing element 316 encased in another material. The outer casing may be transparent to enable optical signal transmission and does not take part in polishing.

Figure 4:
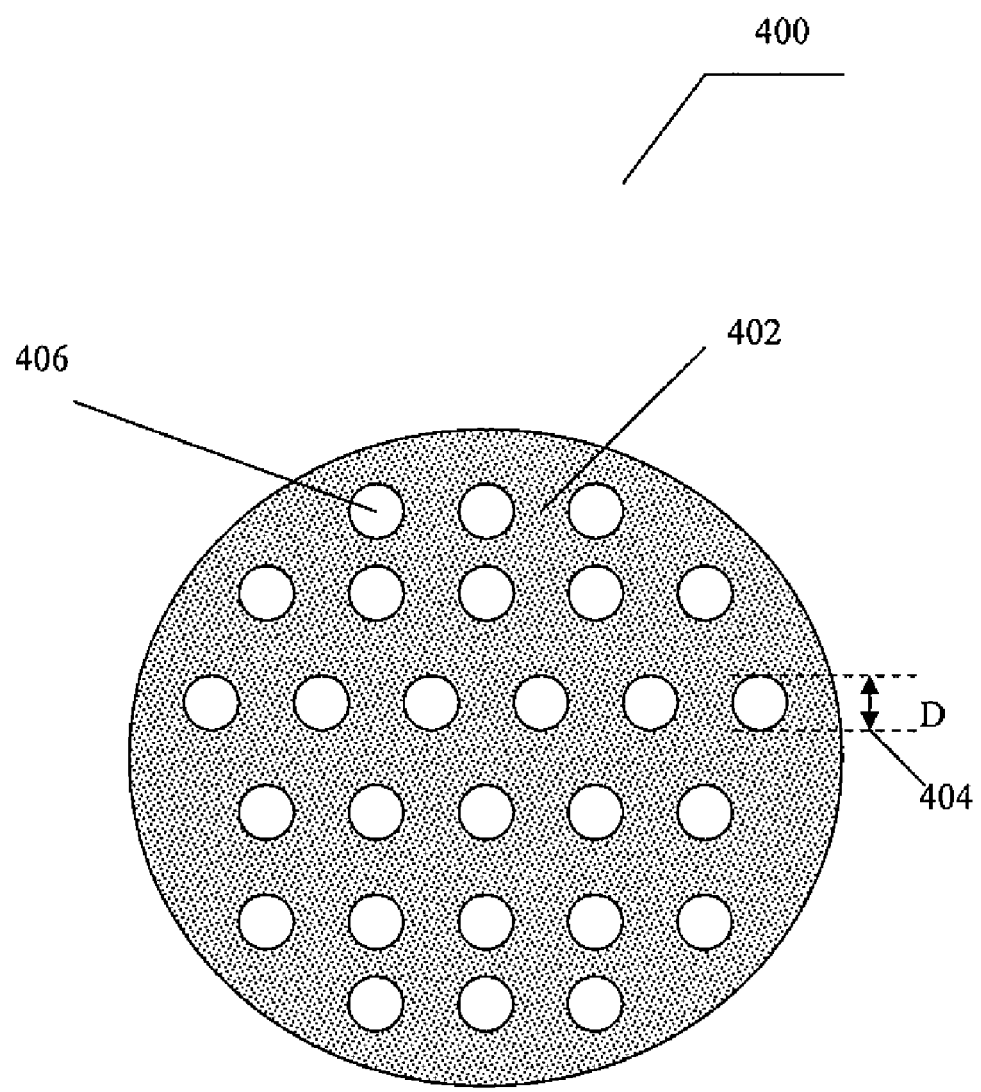
FIG. 4 illustrates a top down view of a polishing pad configured according to a further embodiment of the present invention.

FIG. 4 illustrates a top down view of a pad 400, configured according to one embodiment of the present invention. Pressure-sensing and/or process monitoring polishing elements 406 are interdigitated throughout pad 400. Where present, the slurry distribution material 402 may be permeated throughout the volume created by polishing elements 406 protruding from the guide plate (not shown). While the volume provides a slurry path, the slurry distribution material provides a mechanism to control slurry flow throughout the volume as discussed above.

The distribution of the polishing elements 406 may vary according to specific polishing/process requirements. In varying embodiments, the polishing elements 406 may have a density of between 30 and 80 percent of the total surface area, as determined by the diameter (D) 404 of each element 406 and the diameter of the polishing pad 400. In one embodiment, the diameter (D) 404 is at least 50 micrometers. In other embodiments, the diameter (D) is between 50 micrometers and 12 millimeters.

Thus, an improved CMP polishing pad and process for polishing semiconductor wafers and structures layered thereon has been described. Although the present polishing pad and processes for using it have been discussed with reference to certain illustrated examples, it should be remembered that the scope of the present invention should not be limited by such examples. Instead, the true scope of the invention should be measured on in terms of the claims, which follow.

What is claimed is:

1. A polishing pad assembly, comprising:
a guide plate having a plurality of holes therein and being affixed to a compressible under-layer; and
a plurality of polishing elements, at least one of which includes pressure monitoring sensors and each polishing element is affixed to the compressible under-layer and passing through a corresponding hole in the guide plate so as to be maintained in a substantially vertical orientation with respect to the compressible under-layer but being translatable in a vertical direction with respect to the guide plate in order to contact and polish workpiece.

2. The pad of claim 1, wherein at least one of the polishing elements have circular cross sections.

3. The pad of claim 1, wherein at least one of the polishing elements have triangular cross sections.

4. The pad of claim 1, wherein the polishing elements are made from cast or molded polyurethane.

5. The pad of claim 1, further comprising a slurry distribution material fastened to the guide plate by an adhesive.

6. The pad of claim 1, wherein at least one of the polishing elements are configured for process monitoring.

7. The pad of claim 6, wherein at least one of the polishing elements configured for process monitoring are made of an optically transparent material.

8. The pad of claim 6, wherein at least one of the polishing elements configured for process monitoring include pressure sensors.

9. The pad of claim 6, wherein at least one of the polishing elements configured for include a capacitive or eddy current sensor embedded therein.

10. The pad of claim 6, wherein at least one of the polishing elements configured for process monitoring include a conductive or optically transparent core.

11. The pad of claim 6, wherein at least one of the polishing elements configured for process monitoring include a conductive core and shell with both conducting components separated by insulating material.

12. The pad of claim 6, wherein at least one of the polishing elements configured for process monitoring are encased in another material.

13. The pad of claim 6, wherein at least one of the polishing elements configured for process monitoring include temperature sensors.

14. A polishing pad assembly comprising:
a guide plate having a plurality of holes therein and being affixed to a compressible under-layer; and
a plurality of process monitoring polishing elements each affixed to the compressible under-layer and passing through a corresponding hole in the guide plate so as to be maintained in a substantially vertical orientation with respect to the compressible under-layer but being translatable in a vertical direction with respect to the guide plate in order to contact and polish workpiece.

15. The pad of claim 14, wherein at least one of the process monitoring polishing elements are made of an optically transparent material.

16. The pad of claim 14, wherein at least one of the process monitoring polishing elements include pressure sensors.

17. The pad of claim 14, wherein at least one of the process monitoring polishing elements include a capacitive or eddy current sensor embedded therein.

18. The pad of claim 14, wherein at least one of the process monitoring polishing elements include a conductive or optically transparent core.

19. The pad of claim 14, wherein at least one of the process monitoring polishing elements include a conductive core and shell with both conducting components separated by insulating material.

20. The pad of claim 14, wherein at least one of the process monitoring polishing elements are encased in another material.

21. The pad of claim 14, further comprising a slurry distribution material fastened to the guide plate by an adhesive.

* * * * *